(12) United States Patent
Savvides et al.

(10) Patent No.: US 12,026,226 B2
(45) Date of Patent: Jul. 2, 2024

(54) FEW-SHOT OBJECT DETECTION USING SEMANTIC RELATION REASONING

(71) Applicant: CARNEGIE MELLON UNIVERSITY, Pittsburgh, PA (US)

(72) Inventors: Marios Savvides, Wexford, PA (US); Chenchen Zhu, Pittsburgh, PA (US); Fangyi Chen, Pittsburgh, PA (US); Uzair Ahmed, Pittsburgh, PA (US); Ran Tao, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 398 days.

(21) Appl. No.: 17/408,674

(22) Filed: Aug. 23, 2021

(65) Prior Publication Data

US 2022/0058432 A1    Feb. 24, 2022

Related U.S. Application Data

(60) Provisional application No. 63/068,871, filed on Aug. 21, 2020.

(51) Int. Cl.
*G06F 18/2136* (2023.01)
*G06N 3/04* (2023.01)
*G06N 5/02* (2023.01)

(52) U.S. Cl.
CPC ......... *G06F 18/2136* (2023.01); *G06N 3/04* (2013.01); *G06N 5/02* (2013.01)

(58) Field of Classification Search
CPC ......... G06F 18/2136; G06N 3/04; G06N 5/02
See application file for complete search history.

(56) References Cited

U.S. PATENT DOCUMENTS

| | | | |
|---|---|---|---|
| 2014/0015855 A1* | 1/2014 | Denney | G09G 5/14 345/629 |
| 2018/0089540 A1 | 3/2018 | Merler et al. | |
| 2019/0095716 A1 | 3/2019 | Shrestha et al. | |
| 2019/0272451 A1 | 9/2019 | Lin et al. | |
| 2019/0325243 A1* | 10/2019 | Sikka | G06V 10/267 |
| 2020/0364499 A1* | 11/2020 | Bagherinezhad | G06V 10/82 |
| 2021/0019572 A1 | 1/2021 | Munoz Delgado | |
| 2021/0117949 A1* | 4/2021 | Guo | G06T 7/70 |

OTHER PUBLICATIONS

International Search Report and Written Opinion for Application No. PCT/US22/14833, dated Apr. 26, 2022, 6 pages.

* cited by examiner

*Primary Examiner* — Myron Wyche
(74) *Attorney, Agent, or Firm* — KDW Firm PLLC

(57) ABSTRACT

Disclosed herein is an improved few-shot detector which utilizes semantic relation reasoning to learn novel objects from both visual information and the semantic relation of base class objects Specifically, a semantic space is constructed using word embeddings. Guided by the word embeddings of the classes, the detector is trained to project the objects from the visual space to the semantic space and to align their image representations with the corresponding class embeddings.

16 Claims, 4 Drawing Sheets

FEW-SHOT OBJECT DETECTION USING SEMANTIC RELATION REASONING

RELATED APPLICATIONS

This application claims the benefit of U.S. Provisional Patent Application No. 63/068,871, filed Aug. 21, 2020, the contents of which are incorporated herein in their entirety.

BACKGROUND

Deep learning algorithms typically require a large amount of annotated data to achieve superior performance. To acquire enough annotated data, one common way is by collecting abundant samples from the real world and paying annotators to generate ground-truth labels. However, even if all the data samples are well annotated, a problem still exists regarding few-shot learning. Because long-tail distribution is an inherent characteristic of the real world, there always exist some rare cases that have just a few samples available, for example, rare animals, un-common road conditions, etc. In other word. Because of the few number of samples available for some classes, the situation is not able to be remedied by simply spending more money on annotation of existing samples.

In few-shotobject detection (FSOD), there are base classes in which sufficient objects have been annotated with bounding boxes, and novel classes in which very few labeled objects are available. The novel class set does not share common classes with the base class set. Few-shot detectors are expected to learn from limited data in novel classes with the aid of abundant data in base classes and to be able to detect novel objects in a held-out testing set. To achieve this, most prior art few-shot detection methods adopt ideas from meta-learning and metric learning for few-shot recognition and apply them to conventional detection frameworks (e.g. Faster R-CNN, YOLO).

Although prior art FSOD methods have improved the base-line considerably, data scarcity is still a bottleneck that hurts the detector's generalization from a few samples. In other words, the performance is very sensitive to the number of both explicit and implicit shots and drops drastically as data becomes limited. The explicit shots refer to the available labeled objects from the novel classes. For example, the 1-shot performance of some FSOD methods is less than half of the 5-shot or 10-shot performance, as shown in FIG. 1.

FIG. 1 is a graph showing FSOD performance (mAP50) on VOC Novel Set 1 at for different shot numbers. Solid lines (original) indicate the pre-trained model used for initializing the detector backbone trained on the original ImageNet dataset. Dashed lines (rm-nov) indicate classes in Novel Set 1 which have been removed from the ImageNet dataset for the pretrained backbone model. The invention is more stable to the variation of explicit shots (x-axis) and implicit shots (original vs. rm-nov).

In terms of implicit shots, initializing the backbone network with a model that has been pre-trained on a large-scale image classification dataset is a common practice for training an object detector. However, the classification dataset typically contains many implicit shots of object classes overlapped with the novel classes. As such, the detector can have early access to novel classes and encode their knowledge in the parameters of the backbone. Removing those implicit shots from the pretrained dataset also has a negative impact on the performance, as shown in FIG. 1. The variation of explicit and implicit shots could potentially lead to system failure when dealing with extreme cases in the real world.

The reason for shot sensitivity could be due to exclusive dependence on the visual information. Novel objects are learned through images only and the learning is independent between classes. As a result, visual information becomes limited as image data becomes scarce.

SUMMARY OF THE INVENTION

The key insight in this invention is that the semantic relation between base and novel classes remains constant regardless of the data availability of novel classes. For example, in FIG. 2, "bicycle" is the novel class. If the prior knowledge that the novel class "bicycle" looks similar to "motorbike", can have an interaction with a "person", and can carry a "bottle" is known, it will be easier to learn the concept "bicycle" rather than relying on solely on a few images of a bicycle. Such explicit relation reasoning is even more crucial when visual information is hard to access.

The disclosed invention introduces semantic relations to few-shot detection. In natural language processing, semantic concepts are represented by word embeddings from language models. Explicit relationships are represented by knowledge graphs.

The disclosed invention comprises a Semantic Relation Reasoning Few-Shot Detector (SRR-FSD), which incorporates the semantic relation for FSOD. The SRR-FRD learns novel objects from both visual information and the semantic relation in an end-to-end style. Specifically, a semantic space is constructed using word embeddings. Guided by the word embeddings of the classes, the detector is trained to project the objects from the visual space to the semantic space and to align their image representations with the corresponding class embeddings.

Directly applying these concepts few-shot detectors leads to non-trivial practical problems, i.e. the domain gap between vision and language, and the heuristic definition of knowledge graph for classes in FSOD datasets To address these problems, instead of pre-defining a dynamic relation graph based on heuristics, the invention learns a dynamic relation graph driven by the image data. Then the learned graph is used to perform relation reasoning and to augment the raw embeddings, resulting in a reduced domain gap.

With the help of the semantic relation reasoning, SRR-FSD demonstrates the shot-stable property in two aspects, as shown in FIG. 1. In the common few-shot settings (solid lines), SRR-FSD achieves competitive performance at higher shots and significantly better performance at lower shots compared to prior art few-shot detectors. In a more realistic setting (dashed lines) where implicit shots of novel concepts are removed from the classification dataset for the pretrained model, SRR-FSD steadily maintains the performance while some prior art methods have results degraded by a large margin due to the loss of implicit shots.

The novel aspects of the invention is the use of semantic relation reasoning for the few-shot detection task. The SRR-FSD achieves stable performance with respect to shot variation and outperforms prior art FSOD methods under several existing settings, especially when the novel class data is extremely limited. Even when implicit shots of novel classes are removed from the classification dataset for the pretrained model, SRR-FSD maintains a steadier performance compared to prior art methods.

DETAILED DESCRIPTION

To understand SRR-FSD, it will first be useful to start with an explanation of prior art few-shot object detection. Then, building of the SRR-FSD comprises integrating semantic relation with the visual information in a Faster R-CNN and allowing it to perform relation reasoning in the semantic space. A two-phase training processes.

The conventional object detection problem has a base class set $\mathcal{C}_b$ in which there are many instances, and a base dataset $\mathcal{D}_b$ with abundant images. $\mathcal{D}_b$ consists of a set of annotated images $\{(x_i, y_i)\}$ where $x_i$ is the image and $y_i$ is the annotation of labels from $\mathcal{C}_b$ and bounding boxes for objects in $x_i$. For the few-shot object detection (FSOD) problem, in addition to $\mathcal{C}_b$ and $\mathcal{D}_b$, it also has a novel class set $\mathcal{C}_n$ and a novel dataset $\mathcal{D}_n$, with $\mathcal{C}_b \cap \mathcal{C}_n = 0$. In $\mathcal{D}_n$, objects have labels belong to $\mathcal{C}_n$ and the number of objects for each class is k for k-shot detection. A few-shot detector is expected to learn from $\mathcal{D}_b$ and to quickly generalize to $\mathcal{D}_n$ with a small k such that it can detect all objects in a held-out testing set with object classes in $\mathcal{C}_b \cup \mathcal{C}_n$. We assume all classes in $\mathcal{C}_b \cup \mathcal{C}_n$ have semantically meaningful names, so the corresponding semantic embeddings can be retrieved.

A typical few-shot detector has two training phases. The first phase is the base training phase where the detector is trained on $\mathcal{D}_b$ similarly to conventional object detectors. Then in the second phase, it is further fine-tuned on $\mathcal{D}_b \cup \mathcal{D}_n$. To avoid the dominance of objects from $\mathcal{D}_b$, a small subset is sampled from $\mathcal{D}_b$, such that the training set is balanced concerning the number of objects per class. As the total number of classes is increased by the size of $\mathcal{C}_n$ in the second phase, more class-specific parameters are inserted in the detector and trained to be responsible for the detection of novel objects. The class-specific parameters are usually in the box classification and localization layers at the very end of the network.

Figure 3:
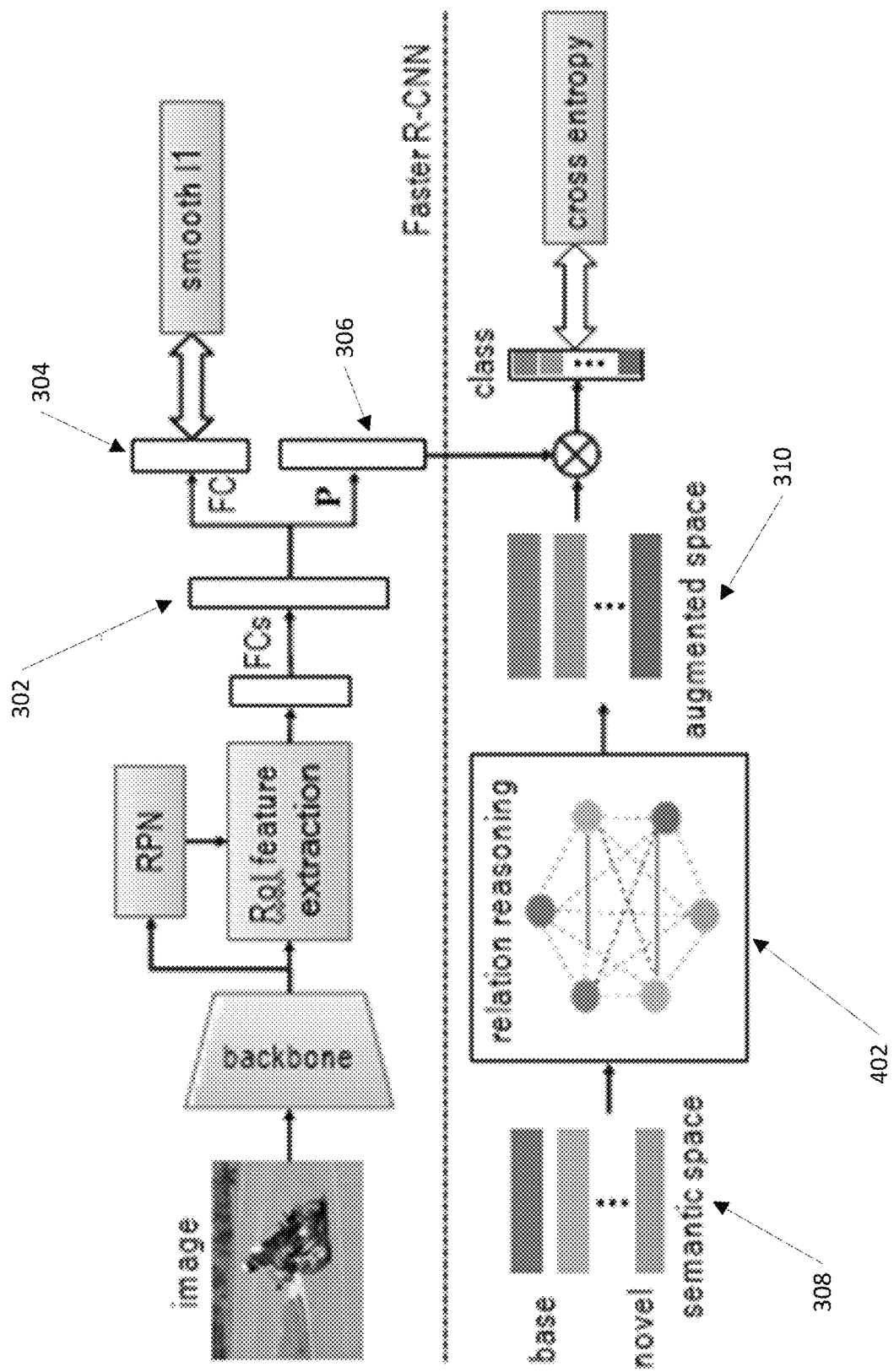
FIG. 3 is a block diagram of the semantically-enhanced few-shot object detector disclosed herein.

An overview of SRR-FSD is illustrated in FIG. 3. A semantic space is built from the word embeddings of all corresponding classes in the dataset and is augmented through a relation reasoning module. Visual features are learned to be projected into the augmented space 310. ("⊗" is the dot product; "FC" is a fully-connected layer; and "P" is a learnable projection matrix).

Semantic Space Projection

The SRR-FSD detector disclosed herein is built on top of Faster R-CNN, a prior art two-stage general object detector. In the second-stage of Faster R-CNN, a feature vector 302 is extracted for each region proposal and forwarded to a classification subnet 304 and a regression subnet 306. In the classification subnet, the feature vector is transformed into a d-dimensional vector $v \in \mathcal{R}^d$ through fully-connected layers. Then v is multiplied by a learnable weight matrix $W \in \mathcal{R}^{N \times d}$ to output a probability distribution as in Eq. (1).

$$p = \text{softmax}(Wv + b) \quad (1)$$

where:
N is the number of classes; and
$b \in \mathcal{R}^N$ is a learnable bias vector.

The probability distribution is used as the classification output of the detector. It represents the object's classification scores by a vector with the length equals to the number of classes.

To learn objects from both the visual information and the semantic relation, a semantic space 308 is first constructed and the visual feature v is projected into this semantic space. Specifically, the semantic space is represented using a set of $d_e$-dimensional word embeddings $W_e \in \mathcal{R}^{N \times d_e}$ corresponding to the N object classes (including the background class). The detector is trained to learn a linear projection $P \in \mathcal{R}^{d_e \times d}$ in the classification subnet such that v is expected to align with its class's word embedding after projection. Mathematically, the prediction of the probability distribution is derived from Eq. (1) as:

$$p = \text{softmax}(W_e P v + b) \quad (2)$$

During training, $W_e$ is fixed and the learnable variable is P. A benefit is that the generalization to novel objects involves no new parameters in P. $W_e$ 308 can simply be expanded with embeddings of the novel classes. The b is retained to model the category imbalance in the detection dataset.

Reducing the Domain Gap Between Vision and Language.

$W_e$ 308 encodes the knowledge of semantic concepts from natural language. While it is applicable in zero-shot learning, it will introduce the bias of the domain gap between vision and language to the FSOD task. Unlike zero-shot learning where unseen classes have no support from images, the few-shot detector can rely on both the images and the embeddings to learn novel objects. When there are very few images to rely on, the knowledge from embeddings can guide the detector towards a decent solution. However, when more images are available, the knowledge from the embeddings may be misleading due to the domain gap, resulting in a suboptimal solution. Therefore, there is a need to augment the semantic embeddings to reduce the domain gap. Leveraging the explicit relationship between classes is effective for embedding augmentation, leading to implementation of a dynamic relation graph.

Relation Reasoning

Figure 4:
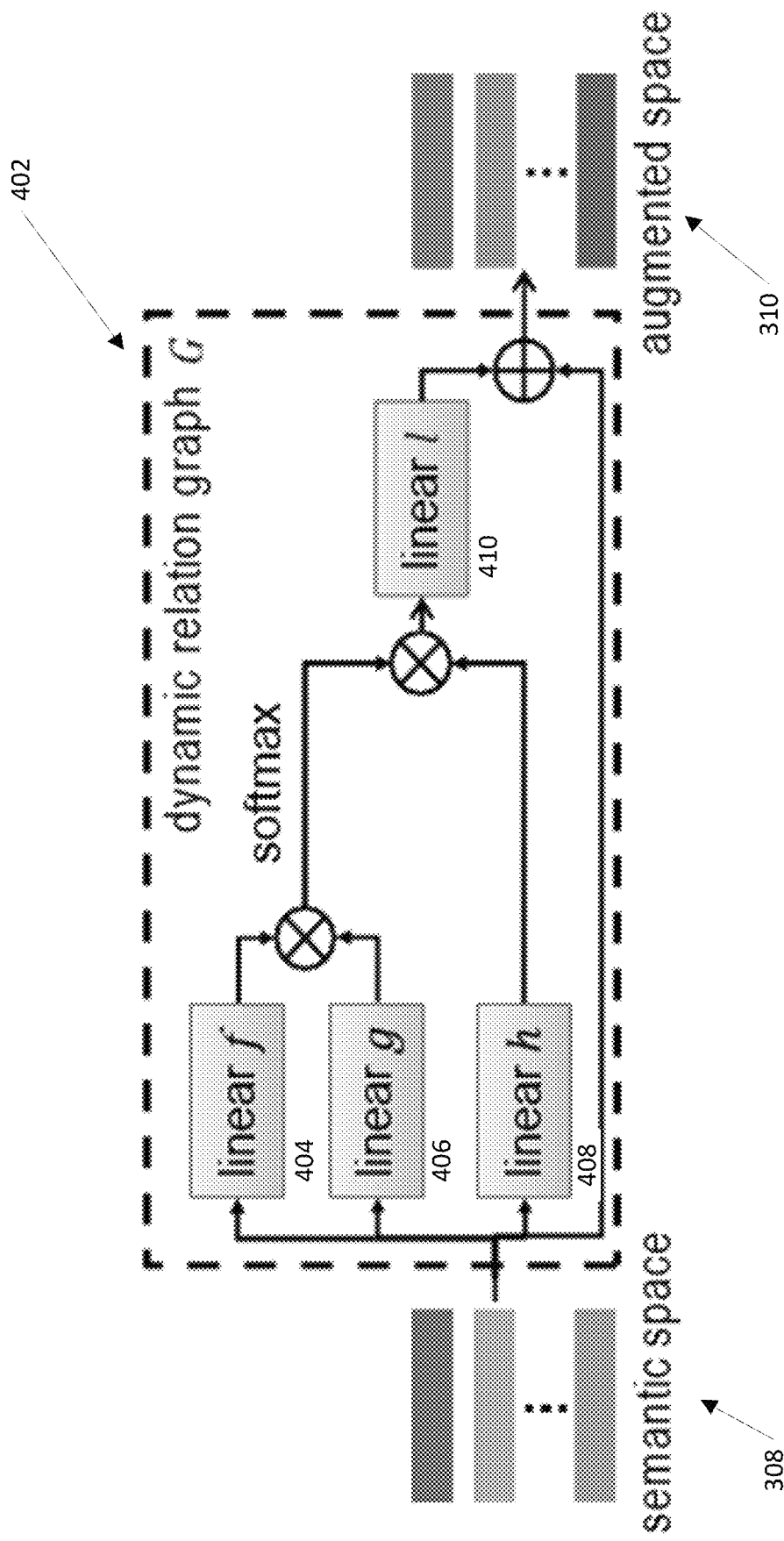
FIG. 4 is a block diagram of the relation reasoning module used to provide the semantic component of the improved few-shot detector disclosed herein.

FIG. 4 shows the network architecture of the relation reasoning module 402 for learning the relation graph G. ("⊗" is the dot product; and "⊕" is the element-wise addition). The semantic space projection learns to align the concepts from the visual space with the semantic space 308. However, each class is still treated independently and there is no knowledge propagation among classes. Therefore, a knowledge graph is introduced to model their relationships. The knowledge graph G is an N×N adjacency matrix representing the connection strength for every neighboring class pairs. G is involved in classification via a graph convolution operation. Mathematically, the updated probability prediction is given as:

$$p = \text{softmax}(GW_e P v + b) \quad (3)$$

In zero-shot or few-shot recognition algorithms, knowledge graph G is predefined base on heuristics. It is usually constructed from a database of common sense knowledge rules by sampling a sub-graph through the rule paths such that semantically related classes have strong connections. For example, classes from the ImageNet dataset have a knowledge graph sampled from the WordNet. However, classes in FSOD datasets are not highly semantically related, nor do they form a hierarchical structure like the ImageNet classes. The only applicable heuristics are based on object co-occurrence. Although the statistics of the co-occurrence are straightforward to compute, the co-occurrence is not necessarily equivalent to semantic relation.

Instead of predefining a knowledge graph based on heuristics, the disclosed invention learns a dynamic relation graph driven by the data to model the relation reasoning between classes. The data-driven graph is also responsible for reducing the domain gap between vision and language because it is trained with image inputs. Inspired by the concept of the transformer, the dynamic relation graph G is implemented with a self-attention architecture as shown in FIG. 4.

The original word embeddings $W_e$ 308 are transformed by three linear layers: f 404, g 406 and h 408, and a self-attention matrix is computed from the outputs of f and g. The self-attention matrix is multiplied with the output of h followed by another linear layer l 410. A residual connection adds the output of l 410 with the original $W_e$ 308. Another advantage of learning dynamic relation graph G is that it can easily adapt to new classes. Because the graph is not fixed and is generated on the fly from the word embeddings 308, it is not necessary to redefine a new dynamic relation graph G and retrain the detector. Corresponding embeddings for new classes can simply be inserted and the detector fine-tuned.

Decoupled Fine-Tuning

In the second fine-tuning phase, only the last few layers of SRR-FSD are unfrozen. For the classification subnet, the parameters in the relation reasoning module and the projection matrix P are fine-tuned. For the localization subnet, it is not dependent on the word embeddings but shares features with the classification subnet. The learning of localization on novel objects can interfere with the classification subnet via the shared features, leading to many false positives. Decoupling the shared fully-connected layers between the two subnets can effectively make each subnet learn better features for its task. In other words, the classification subnet and the localization subnet have individual fully-connected layers and they are fine-tuned independently.

In one embodiment, SRR-FSD is implemented based on Faster R-CNN with ResNet-101 and a Feature Pyramid Network as the backbone using the MMDetection framework. All models are trained with Stochastic Gradient Descent (SGD) and a batch size of 16. For the word embeddings, the L2-normalized 300-dimensional Word2Vec vectors from the language model trained on large unannotated texts like Wikipedia are used. In the relation reasoning module, we reduce the dimension of word embed-dings to 32 which is empirically selected. In the first base training phase, we set the learning rate, the momentum, and the weight decay to 0.02, 0.9, and 0.0001, respectively. In the second fine-tuning phase, we reduce the learning rate to 0.001 unless otherwise mentioned. The input image is sampled by first randomly choosing between the base set and the novel set with a 50% probability and then randomly selecting an image from the chosen set.

Figure 1:
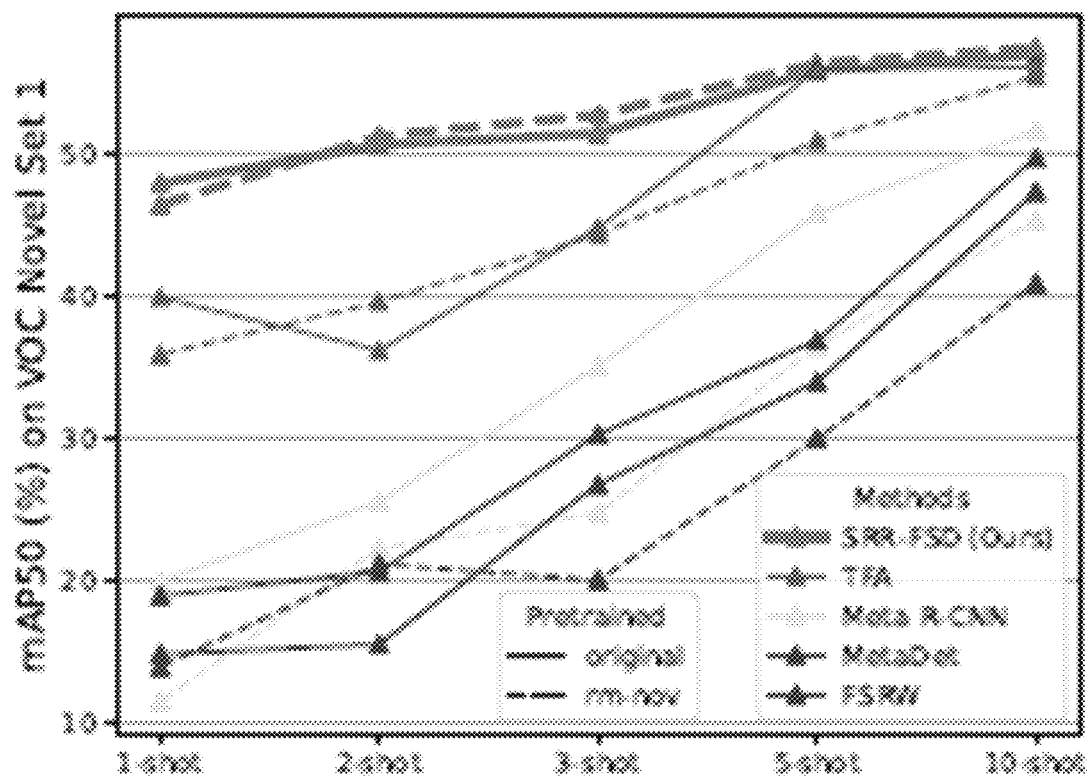
FIG. 1 is a graph showing a comparison of FSOD performance (mAP50) for various few-shot detectors versus the improved few-shot detector if the disclosed herein.
Figure 2:
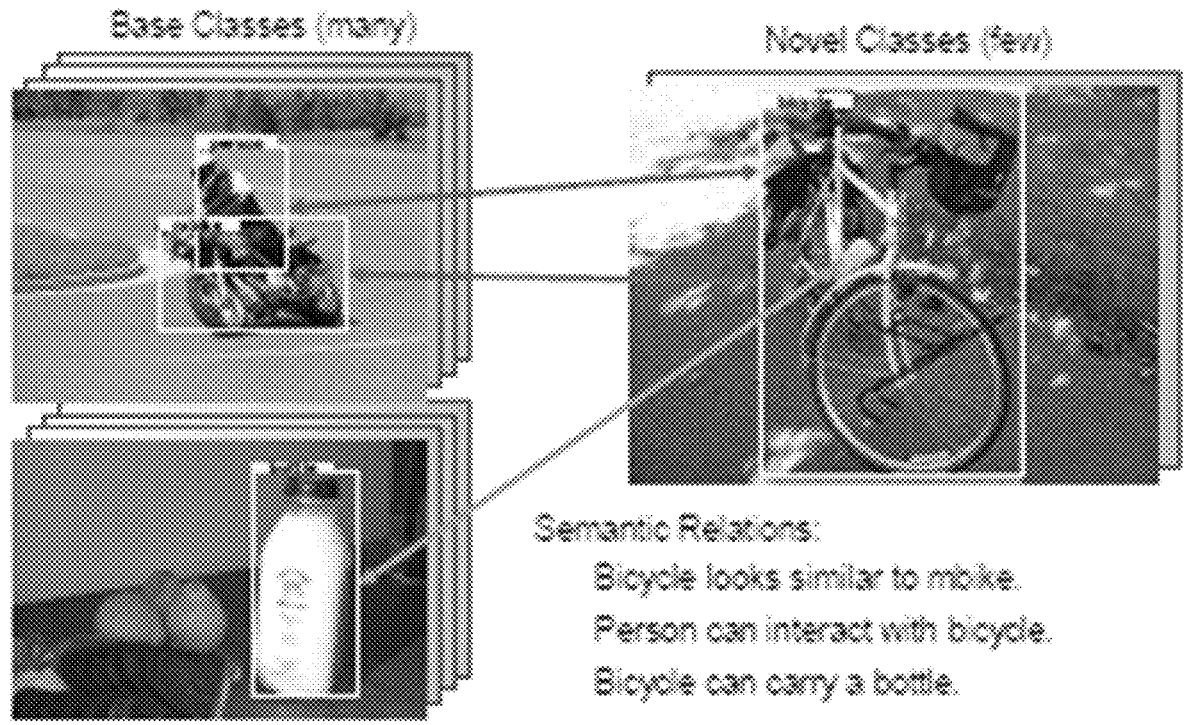
FIG. 2 is a graphic representation showing how semantic information can be used to learn novel classes.

The training of the few-shot detector usually involves initializing the backbone network with a model pretrained on large-scale object classification datasets such as ImageNet. The set of object classes in ImageNet (i.e., $C_o$) is highly overlapped with the novel class set $C_n$ in the existing settings. This means that the pretrained model can get early access to large amounts of object samples, (i.e., implicit shots), from novel classes and encode their knowledge in the parameters before it is further trained for the detection task. Even the pretrained model is optimized for the recognition task. The extracted features still have a big impact on the detection of novel objects, as shown in FIG. 1. However, some rare classes may have highly limited or valuable data in the real world that pretraining a classification network on it is not realistic.

Therefore, a more realistic setting for FSOD, which extends the existing settings may be used. In addition to $C_b \cap C_n = 0$, an additional requirement is that $C_o \cap C_n = 0$. To achieve this, the novel classes are systematically and hierarchically removed from $C_o$. For each class in $C_n$, its corresponding synset is found in ImageNet and its full hyponym (the synset of the whole subtree starting from that synset) is obtained using the ImageNet API. The images of this synset and its full hyponym are removed from the pretrained dataset. The classification model is trained on a dataset with no novel objects.

Semantic Space Projection Guides Shot-Stable Learning

The baseline Faster R-CNN can already achieve satisfying results at 5-shot and 10-shot. However, at 1-shot and 2-shot, performance starts to degrade due to exclusive dependence on images. The semantic space projection, on the other hand, makes the learning more stable to the variation of shot numbers. The space projection guided by the semantic embeddings is learned well enough in the base training phase so it can be quickly adapted to novel classes with a few instances. A major boost occurs at lower shot conditions compared to the baseline. However, the raw semantic embeddings limit the performance at higher shot conditions. The performance at 5-shot and 10-shot drops below the baseline. This verifies the domain gap between vision and language. At lower shots, there is not much visual information to rely on, so the language information can guide the detector to a decent solution. But, when more images are available, the visual information becomes more precise then the language information starts to be misleading. Therefore, the word embeddings are refined to reduce the domain gap.

Relation Reasoning Promotes Adaptive Knowledge Propagation

The relation reasoning module 402 explicitly learns dynamic relation graph G that builds direct connections between base classes and novel classes. The detector can learn the novel objects using the knowledge of base objects besides the visual information. Additionally, the relation reasoning module 402 also functions as a refinement to the raw word embeddings with a data-driven relation graph. Because relation graph G is updated with image inputs, the refinement tends to adapt the word embeddings for the vision domain. Applying relation reasoning improves the detection accuracy of novel objects under different shot conditions.

Decoupled Fine-Tuning (DF) Reduces False Positives.

Most of the false positives are due to misclassification into similar categories. With DF, the classification subnet can be trained independently from the localization subnet to learn better features specifically for classification.

In conclusion, disclosed herein is semantic relation reasoning for few-shot object detection. The key insight is to explicitly integrate semantic relations between base and novel classes with the available visual information, which can assist in improved learning of the novel classes, especially when the novel class data is extremely limited. The semantic relation reasoning is applied to the standard two-stage Faster R-CNN and demonstrates robust few-shot performance against the variation of shot numbers. Compared to prior-art methods, SRR-FSD achieves state-of-the-art results on several few-shot detection settings, as well as a more realistic setting where novel concepts encoded in the pretrained backbone model are eliminated. The key components of SRR-FSD (i.e., semantic space projection and relation reasoning), can be straightforwardly applied to the classification subnet of other few-shot detectors.

The invention has been described in the context of specific embodiments, which are intended only as exemplars of the invention. As would be realized, many variations of the described embodiments are possible. For example, variations in the design, shape, size, location, function and operation of various components, including both software and hardware components, would still be considered to be within the scope of the invention, which is defined by the following claims.

The invention claimed is:

1. A few-shot object detector comprising:
   a backbone network trained on a dataset comprising many instances of base class objects and few instances of novel class objects;
   a semantic space comprising word embeddings; and
   a relation reasoning module for transforming the semantic space into an augmented semantic space containing semantic connections between base classes and novel classes wherein the augmented semantic space propagates semantic information between the base classes and the novel classes;
   wherein a visual feature vector produced by the backbone network is projected into the semantic space via a learned linear projection such that the visual feature vector aligns with the word embeddings corresponding to its object class.

2. The few-shot object detector of claim 1 wherein the word embeddings in the semantic space represent semantic concepts related to object classes in the backbone network detector.

3. The few-shot object detector of claim 1 wherein the visual feature vector is projected into the augmented semantic space.

4. The few-shot object detector of claim 1 wherein the relation reasoning module comprises:
   a dynamic relation graph capturing explicit relationships between object classes.

5. The few-shot object detector of claim 4 wherein the dynamic relation graph is an adjacency matrix representing connection strengths for neighboring class pairs.

6. The few-shot object detector of claim 4 wherein the dynamic relation graph comprises:
   first and second linear layers taking as input the word embeddings and outputting a self-attention matrix;
   a third linear layer taking as input the word embeddings, the output being multiplied by the self-attention matrix;
   a fourth linear layer taking as input the product of the self-attention matrix and the output of the third liner layer; and
   a residual connection adding the word embeddings with the output of the fourth linear layer to create the augmented semantic space.

7. The few-shot detector of claim 1 wherein new classes are added by introducing new word embeddings into the semantic space.

8. The few-shot object detector of claim 1 wherein the backbone network is a two-stage general object detector.

9. The few-shot object detector of claim 6 wherein the two-stage general object detector is a Faster R-CNN.

10. A method for few-shot object detection comprising:
    inputting an image to a backbone network trained on a dataset comprising many instances of base class objects and few instances of novel class objects;
    receiving a feature vector from the backbone network;
    transforming the feature vector into a visual feature vector using a fully-connected layer;
    projecting the visual feature vector into a semantic space using a learned linear projection such that the visual feature vector aligns with the word embeddings corresponding to its object class; and
    transforming the semantic space into an augmented semantic space containing semantic connections between base classes and novel classes using a relation reasoning module wherein the augmented semantic space propagates semantic information between the base classes and the novel classes.

11. The method of claim 10 wherein the semantic space comprises word embeddings related to the base class objects.

12. The method of claim 10 wherein the visual feature vector is projected into the augmented semantic space.

13. The method of claim 10 wherein the relation reasoning module comprises:
    a dynamic relation graph capturing explicit relationships between object classes.

14. The method of claim 13 wherein the dynamic relation graph is an adjacency matrix representing connection strengths for neighboring class pairs.

15. The method of claim 12 wherein transforming the semantic space to an augmented semantic space comprises:
    inputting the word embeddings in the semantic space to first and second linear layers;
    multiplying outputs of the first and second layers to yield a self-attention matrix;
    inputting the word embeddings in the semantic space to a third linear layer;
    multiplying an output of the third linear layer and the self-attention matrix;
    inputting the product of the self-attention matrix and the output of the third linear layer to a fourth linear layer; and
    adding the output of the fourth linear layer to the word embeddings to create the augmented semantic space.

16. The method of claim 10 wherein new classes are added by introducing new word embeddings into the semantic space.

* * * * *